(12) United States Patent
Suthersan

(10) Patent No.: US 6,254,310 B1
(45) Date of Patent: *Jul. 3, 2001

(54) IN-WELL AIR STRIPPING AND ADSORPTION

(75) Inventor: Suthan S. Suthersan, Yardley, PA (US)

(73) Assignee: ARCADIS Geraghty & Miller, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,508

(22) Filed: May 8, 2000

Related U.S. Application Data

(63) Continuation of application No. 09/140,244, filed on Aug. 26, 1998, now Pat. No. 6,174,108, which is a continuation-in-part of application No. 08/858,267, filed on May 19, 1997, now Pat. No. 6,007,274.

(51) Int. Cl.$^7$ ........................................................ E21B 43/38
(52) U.S. Cl. .................. 405/128.15; 405/52; 405/128.1; 166/267; 210/747
(58) Field of Search ..................................... 405/128, 258, 405/129, 131; 210/747; 166/267, 266, 272, 273

(56) References Cited

U.S. PATENT DOCUMENTS

| | | | |
|---|---|---|---|
| Re. 33,102 | 10/1989 | Visser et al. ..................... | 166/267 |
| 825,745 | 7/1906 | Mitchell . | |
| 1,286,666 | 12/1918 | Layne . | |
| 1,877,915 | 9/1932 | Lewis . | |
| 2,104,327 | 1/1938 | Kotzebue .............................. | 166/21 |
| 2,180,400 | 11/1939 | Coberly ................................. | 103/46 |
| 2,523,091 | 9/1950 | Bruce ..................................... | 166/2 |
| 2,635,696 | 4/1953 | Asketh ................................... | 166/1 |
| 2,765,850 | 10/1956 | Allen ..................................... | 166/39 |
| 2,875,831 | 3/1959 | Martin et al. ......................... | 166/9 |
| 2,969,226 | 1/1961 | Huntington ........................... | 262/3 |
| 3,216,905 | 11/1965 | Baptist .................................. | 195/2 |
| 3,277,962 | 10/1966 | Flickinger et al. .................. | 166/15 |

(List continued on next page.)

FOREIGN PATENT DOCUMENTS 3427 532 C1    8/1985 (DE) .

OTHER PUBLICATIONS

A Monitoring and Removal Program for Leaked Propane Gas in the Vadose (Unsaturated) Zone: A Case Study (Thomas Lobasso, Jr. and Andrew J. Barber).

Hydrogeologic and Geochemical Investigation, Mt. Olive Greens, Mt. Olive Township, N.J. —Nov., 1982.

Ground Water and Wells—A Reference Book for the Water–Well Industry—$4^{th}$ Printing 1975, Chapter 10, pp. 185–208 and Chapter 20, pp. 375–394.

(List continued on next page.)

Primary Examiner—Thomas B. Will
Assistant Examiner—Alexandra K. Pechhold
(74) Attorney, Agent, or Firm—Standley & Gilcrest LLP

(57) ABSTRACT

A method and system for removing contaminants from the phreatic zone, also known as the saturation zone, or groundwater. The technique preferably involves gas sparging while slowing down the sparging process by placing packing balls into an eductor tube. A preferred embodiment of the system is comprised of a means for supplying gas to the lower extent of a well which induces a flow of groundwater and gas bubbles up the well. The system may also contain a conduit within the well which extends below the water table. The conduit has a lower fluid-permeable section which is located below the water table and an upper fluid-permeable section which is adjacent to the water table. The system may further comprise an eductor tube contained in the conduit which extends from the top extent of the conduit to the saturation zone. Packing balls may be located between the eductor tube and the means for supplying gas to the lower extent of the well. The system may also include separating the gas bubbles from the groundwater at the top of the conduit.

7 Claims, 6 Drawing Sheets

U.S. PATENT DOCUMENTS

| | | | |
|---|---|---|---|
| 3,351,132 | 11/1967 | Dougan et al. | 166/11 |
| 3,547,190 | 12/1970 | Wilkerson | 166/75 |
| 3,649,533 | 3/1972 | Reijonen et al. | 210/50 |
| 3,653,438 | 4/1972 | Wagner | 166/266 |
| 3,665,716 | 5/1972 | Rogers et al. | 61/35 |
| 3,705,851 | 12/1972 | Brauer | 210/1 |
| 3,727,686 | 4/1973 | Prates et al. | 166/261 |
| 3,735,815 | 5/1973 | Myers | 166/313 |
| 3,765,483 | 10/1973 | Vencil | 166/265 |
| 3,796,883 | 3/1974 | Smith et al. | 250/260 |
| 3,823,777 | 7/1974 | Allen et al. | 166/266 |
| 3,828,525 | 8/1974 | Copa et al. | 55/68 |
| 3,846,290 | 11/1974 | Raymond | 210/11 |
| 3,980,138 | 9/1976 | Knopik | 166/314 |
| 3,990,513 | 11/1976 | Perch | 166/267 |
| 4,016,930 | 4/1977 | Arnold | 166/266 |
| 4,026,355 | 5/1977 | Johnson et al. | 166/246 |
| 4,126,556 | 11/1978 | Swanson et al. | 210/242 AS |
| 4,167,973 | 9/1979 | Forte et al. | 166/267 |
| 4,183,407 | 1/1980 | Knopik | 166/314 |
| 4,241,787 | 12/1980 | Price | 166/105 |
| 4,283,212 | 8/1981 | Graham et al. | 62/18 |
| 4,296,810 | 10/1981 | Price | 166/265 |
| 4,303,127 | 12/1981 | Freel et al. | 166/266 |
| 4,306,961 | 12/1981 | Taciuk | 208/11 R |
| 4,323,122 | 4/1982 | Knopik | 166/267 |
| 4,366,846 | 1/1983 | Curati, Jr. | 141/1 |
| 4,369,839 | 1/1983 | Freeman et al. | 166/53 |
| 4,401,569 | 8/1983 | Jhaveri et al. | 210/610 |
| 4,435,292 | 3/1984 | Kirk et al. | 210/747 |
| 4,442,901 | 4/1984 | Zison | 166/369 |
| 4,469,176 | 9/1984 | Zison et al. | 166/250 |
| 4,518,399 | 5/1985 | Croskell et al. | 55/16 |
| 4,544,381 | 10/1985 | Schmidt | 55/89 |
| 4,574,062 | 3/1986 | Weitman | 261/147 |
| 4,576,717 | 3/1986 | Collin et al. | 210/610 |
| 4,588,506 | 5/1986 | Raymond et al. | 210/606 |
| 4,593,760 | 6/1986 | Visser et al. | 166/267 |
| 4,625,801 | 12/1986 | McLaughlin et al. | 166/267 |
| 4,660,639 | 4/1987 | Visser et al. | 166/267 |
| 4,662,900 | 5/1987 | Ottengraf | 55/90 |
| 4,664,805 | 5/1987 | Focht | 210/611 |
| 4,683,064 | 7/1987 | Hallberg et al. | 210/605 |
| 4,713,343 | 12/1987 | Wilson, Jr. et al. | 435/264 |
| 4,715,965 | 12/1987 | Sigerson et al. | 210/800 |
| 4,723,968 | 2/1988 | Schippert et al. | 55/80 |
| 4,730,672 | 3/1988 | Payne | 166/266 |
| 4,738,206 | 4/1988 | Noland | 110/346 |
| 4,745,850 | 5/1988 | Bastian et al. | 98/56 |
| 4,749,491 | 6/1988 | Lawes et al. | 210/610 |
| 4,755,304 | 7/1988 | Hallberg et al. | 210/747 |
| 4,765,902 | 8/1988 | Ely et al. | 210/610 |
| 4,780,215 | 10/1988 | Carlson | 210/722 |
| 4,782,625 | 11/1988 | Gerken et al. | 47/1.42 |
| 4,799,878 | 1/1989 | Schaeffer | 431/202 |
| 4,806,148 | 2/1989 | Ottengraf | 55/223 |
| 4,832,122 | 5/1989 | Corey et al. | 166/266 |
| 4,832,711 | 5/1989 | Christel, Jr. et al. | 55/20 |
| 4,842,448 | 6/1989 | Koerner et al. | 405/258 |
| 4,846,134 | 7/1989 | Perry et al. | 123/520 |
| 4,846,852 | 7/1989 | Schweitzer et al. | 55/31 |
| 4,848,460 | 7/1989 | Johnson, Jr. et al. | 166/245 |
| 4,850,745 | 7/1989 | Hater et al. | 405/258 |
| 4,864,942 | 9/1989 | Fochtman et al. | 110/226 |
| 4,872,994 | 10/1989 | Jakob | 210/691 |
| 4,886,119 | 12/1989 | Bernhardt et al. | 166/267 |
| 4,890,673 | 1/1990 | Payne | 166/266 |
| 4,892,688 | 1/1990 | Bernhardt | 261/24 |
| 4,895,085 | 1/1990 | Chips | 110/346 |
| 4,919,570 | 4/1990 | Payne | 405/128 |
| 4,943,305 | 7/1990 | Bernhardt | 55/170 |
| 4,945,988 | 8/1990 | Payne et al. | 166/266 |
| 4,950,394 | 8/1990 | Bernhardt et al. | 210/170 |
| 4,951,417 | 8/1990 | Gerken et al. | 47/1.42 |
| 4,954,258 | 9/1990 | Little | 210/611 |
| 4,966,611 | 10/1990 | Schumacher et al. | 55/20 |
| 4,982,788 | 1/1991 | Donnelly | 166/266 |
| 5,006,250 | 4/1991 | Roberts et al. | 210/610 |
| 5,009,266 | 4/1991 | Dieter | 166/245 |
| 5,015,365 | 5/1991 | Vara et al. | 208/262.1 |
| 5,017,289 | 5/1991 | Ely et al. | 210/610 |
| 5,050,676 | 9/1991 | Hess et al. | 166/267 |
| 5,061,458 * | 10/1991 | Miller | 210/170 |
| 5,069,286 | 12/1991 | Roensch et al. | 166/312 |
| 5,076,360 | 12/1991 | Morrow | 166/267 |
| 5,076,727 | 12/1991 | Johnson et al. | 405/128 |
| 5,080,793 | 1/1992 | Urlings | 210/603 |
| 5,086,717 | 2/1992 | McCrossan | 110/346 |
| 5,095,975 | 3/1992 | Bernhardt | 166/67 |
| 5,111,883 | 5/1992 | Savery | 166/269 |
| 5,116,163 | 5/1992 | Bernhardt | 405/128 |
| 5,122,165 | 6/1992 | Wang et al. | 55/38 |
| 5,122,166 | 6/1992 | Hyrcyk et al. | 55/38 |
| 5,143,606 | 9/1992 | Bernhardt | 210/170 |
| 5,143,607 | 9/1992 | Bernhardt | 210/170 |
| 5,147,535 | 9/1992 | Bernhardt | 210/138 |
| 5,161,914 | 11/1992 | Rahn et al. | 405/128 |
| 5,171,103 | 12/1992 | Bernhardt | 405/128 |
| 5,172,764 | 12/1992 | Hajali et al. | 166/267 |
| 5,173,092 | 12/1992 | Rudder | 55/53 |
| 5,180,503 | 1/1993 | Gorelick et al. | 210/758 |
| 5,183,563 | 2/1993 | Rodden | 210/180 |
| 5,185,080 | 2/1993 | Boyle | 210/611 |
| 5,197,541 | 3/1993 | Hess et al. | 166/67 |
| 5,220,958 | 6/1993 | Bernhardt | 166/67 |
| 5,221,159 | 6/1993 | Billings et al. | 405/128 |
| 5,263,795 | 11/1993 | Corey et al. | 405/128 |
| 5,277,815 | 1/1994 | Beeman | 210/605 |
| 5,279,740 | 1/1994 | Basile et al. | 210/610 |
| 5,281,333 | 1/1994 | Bernhardt | 210/170 |
| 5,302,286 | 4/1994 | Semprini et al. | 210/610 |
| 5,318,698 | 6/1994 | Bernhardt | 210/150 |
| 5,330,651 | 7/1994 | Robertson et al. | 210/617 |
| 5,358,357 | 10/1994 | Mancini et al. | 405/128 |
| 5,382,267 | 1/1995 | Savage et al. | 44/623 |
| 5,384,048 | 1/1995 | Hazen et al. | 210/605 |
| 5,389,267 | 2/1995 | Gorelick et al. | 210/758 |
| 5,402,848 | 4/1995 | Kelly | 166/266 |
| 5,425,598 | 6/1995 | Pennington | 405/118 |
| 5,439,594 | 8/1995 | Regan et al. | 210/747 |
| 5,441,365 | 8/1995 | Duffney et al. | 405/128 |
| 5,441,641 | 8/1995 | Vail et al. | 210/611 |
| 5,456,550 | 10/1995 | Devlin | 405/128 |
| 5,480,549 | 1/1996 | Looney et al. | 1210/610 |
| 5,545,801 | 8/1996 | Fulton | 588/249 |
| 5,545,803 | 8/1996 | Heath et al. | 588/253 |
| 5,554,290 | 9/1996 | Suthersan | 210/610 |
| 5,575,589 | 11/1996 | Suthersan | 405/128 |
| 5,588,490 | 12/1996 | Suthersan et al. | 166/370 |
| 5,620,593 | 4/1997 | Stagner | 210/90 |
| 5,698,092 | 12/1997 | Chen | 210/94 |
| 5,713,522 | 2/1998 | Lundberg | 239/265.39 |
| 5,833,388 | 11/1998 | Edwards et al. | 405/52 |
| 5,833,855 | 11/1998 | Saunders | 210/611 |
| 5,893,975 | 4/1999 | Eifert | 210/602 |
| 6,007,274 | 12/1999 | Suthersan | 405/128 |
| 6,110,372 * | 8/2000 | Perriello | 210/611 |

OTHER PUBLICATIONS

Water Well Technology—Field Principals of Exploration Drilling and Development of Ground Water and Other Selected Minerals (4 page cover and pp. 240–308) (Michael D. Campbell and Jay H. Lehr).

SPL External Vapor Vending (Elimination) Program—Nov. 2, 1983.

Near Surface Geochemical Monitoring of Underground Gas Storage Facilities—Apr., 1986.

LEXIS–NEXIS—Environmental Protection Agency, Upjohn Manufacturing Company—Sep. 30, 1988.

Declaration Statement—Record of Decision; Rod Decision Summary (with attachments); and Responsive Summary, Upjohn Manufacturing Company, Superfund Site, Barceloneta, Puerto Rico.

Public Notice (3 pages).

Fifth National Outdoor Action Conference on Aquifer Restoration, Ground Water Monitoring, and Geophysical Methods—May 13–16, 1991 (Ground Water Mgmt., Book 5 of the Series).

HAZTECH International '88—Hazardous Waste & Hazardous Materials Management—Sep. 20–22, 1988.

The Fifth National Symposium and Exposition on Aquifer Restoration and Ground Water Monitoring—May 21–24, 1985.

Proceedings of the NWWA/API Conference on Petroleum Hydrocarbons and Organic Chemicals in Ground Water—Prevention, Detection and Restoration—Nov. 13–15, 1985.

Vol. II, Proceedings of Petroleum Hydrocarbons and Organic Chemicals in Ground Water: Prevention, Detection and Restoration—Nov. 9–11, 1988.

In Situ Aeration of Groundwater: A Technology Overview—Oct. 16–17, 1990.

In Situ Walls, Remediation Engineering, Chapter 7, pp. 187–206.

* cited by examiner

IN-WELL AIR STRIPPING AND ADSORPTION

This is a continuation of U.S. application Ser. No. 09/140,244, filed Aug. 26, 1998 now U.S. Pat. No. 6,174, 108 which is a continuation-in-part of U.S. application No. 08/858,267, filed May 19, 1997, now U.S. Pat. No. 6,007, 274 both of which are incorporated herein by reference.

BACKGROUND OF THE INVENTION

The present invention relates generally to a method and apparatus for removing contaminants from groundwater and, more particularly, to an in situ sparging method and apparatus for removing volatile organic compounds (VOCs) from groundwater.

Contamination of the phreatic zone, also known as the zone of saturation, or groundwater with potentially hazardous materials is a common problem facing industry, the government, and the general public. The most common type of VOC pollutants are petroleum-based products. Frequently, as a result of spills, leakage from storage facilities, or surface discharges, contaminants percolate into groundwater, thereby posing a threat to drinking water supplies.

While groundwater is not as susceptible to pollution as surface water, once polluted, its restoration is difficult and long term. Typically, contaminated groundwater is removed from the phreatic zone, treated, and then returned to the phreatic zone. These "pump-and-treat", or above-ground, methods are extremely expensive. On the other hand, known in situ water treatment devices may employ air lift pumping as a means of producing gas bubbles to remove VOCs. The theory is that gas is pumped into the wells which causes water and subsequently formed gas bubbles to rise upward. VOCs are transferred from the contaminated water to the gas bubbles which can then be collected for treatment. However, known in situ water treatment devices may not result in rapid vapor saturation which results in a slow and inefficient process. Vapor saturation occurs when the rising bubbles become saturated with VOC vapor. Therefore, there is a need for the development of an improved in situ gas sparging remediation method for removing contaminants in an inexpensive and more efficient manner.

The present invention involves new concepts for in-well removal of contaminants from the saturation zone. It avoids expensive "above ground" remediation methods, and provides a more efficient method of gas sparging than recently developed in situ remediation methods. The present invention is an in-well air stripping and adsorption technique designed to provide inexpensive, efficient gas sparging. The injected gas may be air or any specific or combination of gases such as carbon monoxide. In addition, the injected gas may be at any temperature.

SUMMARY OF THE INVENTION

Preferred embodiments of the present invention provide an inexpensive and more efficient method and system for removing VOCs from contaminated groundwater. One preferred embodiment of the present invention injects a gas into the lower extent of a well to force groundwater up the well causing VOCs to be transferred to rising gas bubbles inside the well. The efficiency of the air stripping may be increased by placing packers, filters, and/or packing balls into the well. The gas bubbles containing VOC vapors are then separated from the groundwater at the upper extent of the well. As this process is repeated and the groundwater continues to circulate, the concentration of VOCs in the water is gradually reduced.

It is preferred that the gas is supplied to the lower extent of the well by an air pump which is in fluid communication with a tube positioned within a conduit, where the tube has an opening at its lower extent.

It is preferred that the separated gas bubbles and the captured air be stored upon being released from the conduit. It is also preferred to remove the contaminants from the gas bubbles and captured air prior to returning the gas to the gas supply or discharging the gas to the atmosphere.

The system for removing VOCs from contaminated groundwater may be comprised of a means for supplying gas to the lower extent of a well which induces a flow of groundwater and gas bubbles up the well. The system may contain a conduit within the well which extends below the water table. The conduit may have a lower fluid-permeable section which is located below the water table and an upper fluid-permeable section which is adjacent to the water table. The present invention may be further comprised of an internal pipe or eductor tube contained in the conduit which extends from about the top extent of the conduit to the saturation zone. Packers, filters, and/or packing balls may be located between the eductor tube and the means for supplying gas to the lower extent of the well. The present invention may also include means located at about the top of the conduit for separating the gas bubbles from the groundwater.

The system for removing VOCs from contaminated groundwater preferably includes packing, filters, and/or packing balls on the interior of the eductor tube to increase the surface area for stripping. The stripping efficiency of VOCs depends on the air-to-water ratio.

It is preferred that the system of the present invention includes a gas supplying means which has a tube contained within the eductor tube which extends from above the ground surface to below the water table. The gas supplying means also preferably includes a pump to supply gas to the tube.

In addition, it is preferred that the system of the present invention includes a bentonite seal located between the conduit and well wall to separate the treated water from the untreated water.

It is further preferred that the system of the present invention include means for capturing the gas bubbles which have been separated from the groundwater.

In addition to the novel features and advantages mentioned above, other objects and advantages of the present invention will be readily apparent from the following descriptions of the drawings and preferred embodiments.

DETAILED DESCRIPTION OF PREFERRED EMBODIMENTS

Figure 1:
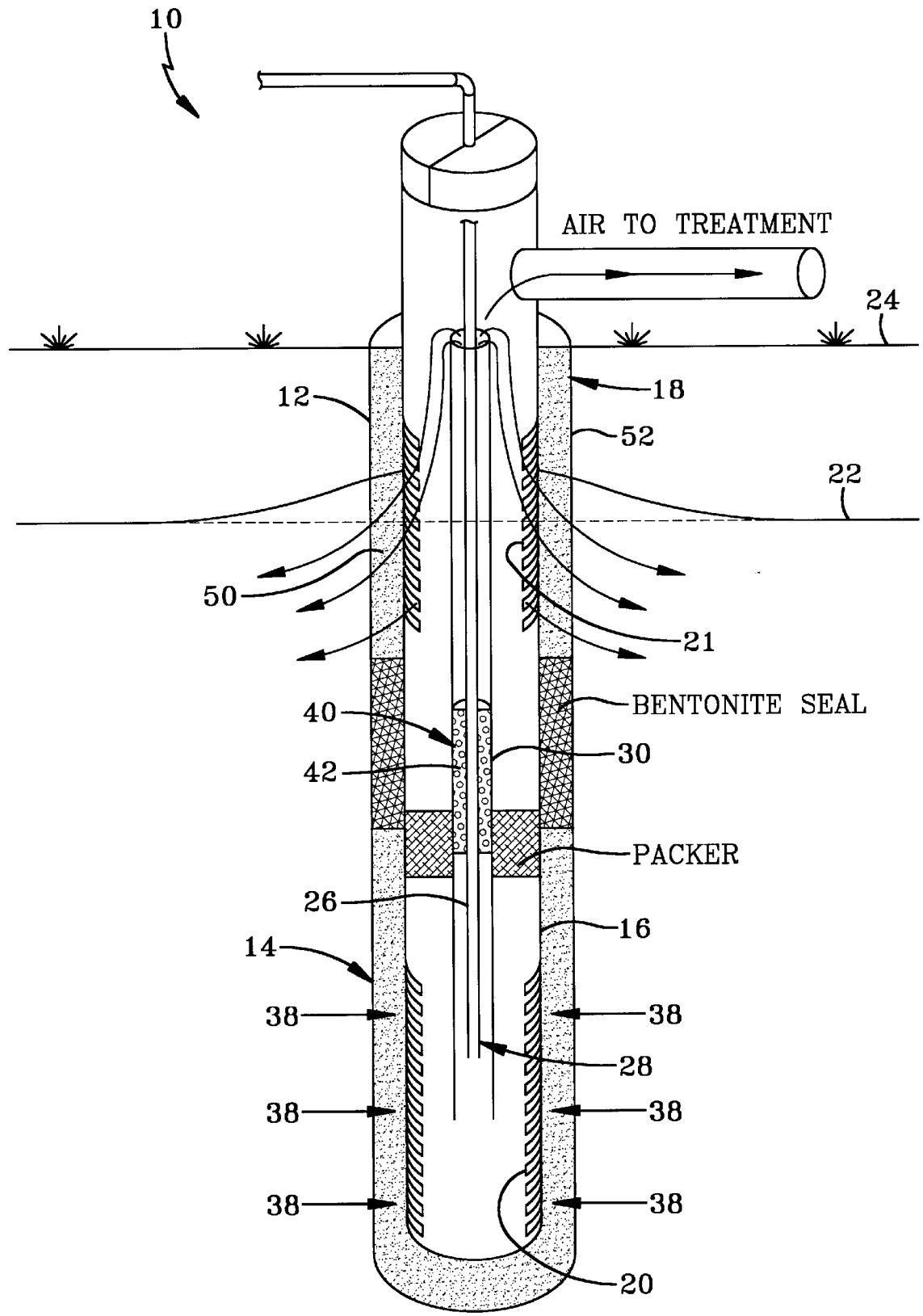
FIG. 1 is a cross-sectional view of one preferred embodiment of the present invention.

FIG. 1 illustrates one embodiment of a system 10 of the present invention. The system 10 removes VOCs from contaminated groundwater by supplying air into a well 18 through air sparging. Air sparging is the process of forcing air through water to remove volatile gases. When air is injected into a well 18, groundwater is lifted upward through the well 18 creating a recirculating cleaning process. As the groundwater rises up through the well 18, VOCs are transferred from the contaminated groundwater to rising air bubbles created by the air supply. The VOC vapor may then be released at the top of the well 18 or, alternatively, captured for storage or treatment. The treated water may flow out of the conduit 16 to mix with the groundwater.

In the example of FIG. 1, a borehole 12 is positioned in the contaminated area extending down into the phreatic, or saturated, zone 14 of the well. The external conduit 16 is positioned within the borehole 12. The conduit 16 has a fluid-permeable section 20 below the water table, and the conduit 16 has another fluid-permeable section 21 located near the water table 22 but below ground level 24. The fluid-permeable sections 21, 22 may be comprised of screened or perforated PVC pipe or another suitable material. The remaining portions of conduit 16 may be comprised of impermeable material such as PVC pipe or another suitable material.

An internal pipe 30, or eductor pipe, is placed between the air tube 26 and the external pipe 16. The air being pumped into the well is substantially contained in the eductor pipe 30. The eductor pipe 30 may be closed at the lower end. If the eductor pipe is closed at the lower end, slots or perforations may be placed at the lower end to allow water to flow into the pipe while substantially preventing air bubbles from escaping.

A compressed air tube 26 is positioned within the conduit 16 and extends to about the bottom portion of the conduit 16 at about zone 28. The tube 26 may be open at its base and attached to an air pump (not shown) at its top portion. Alternatively, an air pump may be located at about the base of the conduit 16 and connected to tube 26 at about zone 28 (not shown).

A preferred operation of the present invention may be understood by reference to FIG. 1. Groundwater may flow through the phreatic zone 14 as illustrated by the solid line arrows 38. Alternatively, the groundwater may not flow through the phreatic zone. The present invention may operate effectively in either case.

An air pump may be operated to force air into the air tube 26 down to the base of the conduit 16 at about zone 28. A gas, such as carbon monoxide, may also be used as appropriate. The air may be injected at various rates to vary the rate at which groundwater circulates toward the well 18.

The air being pumped into the tube 26 is released at the base of the conduit at about zone 28 creating air bubbles. Subsequently, water flows up the well 18 through the eductor tube 30, while water surrounding the well 18 is pulled towards the well 18. The water/air mixture rises up in the space or "mixing zone" 40 between the air tube 26 and the eductor tube 30. As the air rises, it mixes with the water within the eductor tube 30 and creates water flow from the lower permeable section 20 of the conduit 16 upward through and out of the top portion of the eductor tube 30 and then through the upper permeable section 21 of the conduit 16.

During the time that the water/air mixture is flowing up the eductor pipe 30, VOCs are transferred from the water to the gas phase. Or in other words, while mixing with the water, the air sparges the water of volatile contaminants in the mixing zone 40. The air/contaminant gas mixture is then separated from the water/air mixture near the top portion of the conduit 16. Once the air/contaminant gas mixture is separated from the water, the air/contaminant gas mixture may be released above the water table 22 into the atmosphere. Alternatively, the air/contaminant gas mixture may be captured and transferred for treatment or storage. The VOC vapor can be extracted from the gas mixture using vapor extraction techniques. Once the air/contaminant gas mixture is separated from the water, the water, less a portion of VOCs, may flow back into the aquifer through the upper permeable section 21 of the conduit 16.

As discussed previously, while the water/air mixture is flowing up the eductor pipe 30, VOCs are transferred from the water to the gas phase. However, frequently this process does not result in rapid vapor saturation. Vapor saturation occurs when the rising bubbles become saturated with VOC vapor. If the rising air rises too rapidly, only small amounts of VOCs are transferred from the water to the air. This results in a poor stripping efficiency which results in a slower and less efficient clean up process. To enhance the stripping process, packing materials 42 such as JAEGER TRIPACK balls may be placed in the zone 40 to cause the air and water to pass over the surface of the balls resulting in more efficient air stripping. However, those skilled in the art should recognize that the packing means may include other suitable packing materials such as filters or other similar materials.

Adsorption media 50 may be placed in a trench 52 or annular holes near the top of the well 18 for use in remediating residue of contamination not removed by the air stripping and/or contaminants, such as heavy metals, which are not removed by air stripping. As the water passes through the upper permeable section 21 of the conduit 16, it proceeds to pass through the adsorption media 50 that resides in the trench 52. Those skilled in the art should recognize that the adsorption media 50 may be comprised of activated carbon, ion exchange material, other similar materials, or other suitable materials.

Figure 2:
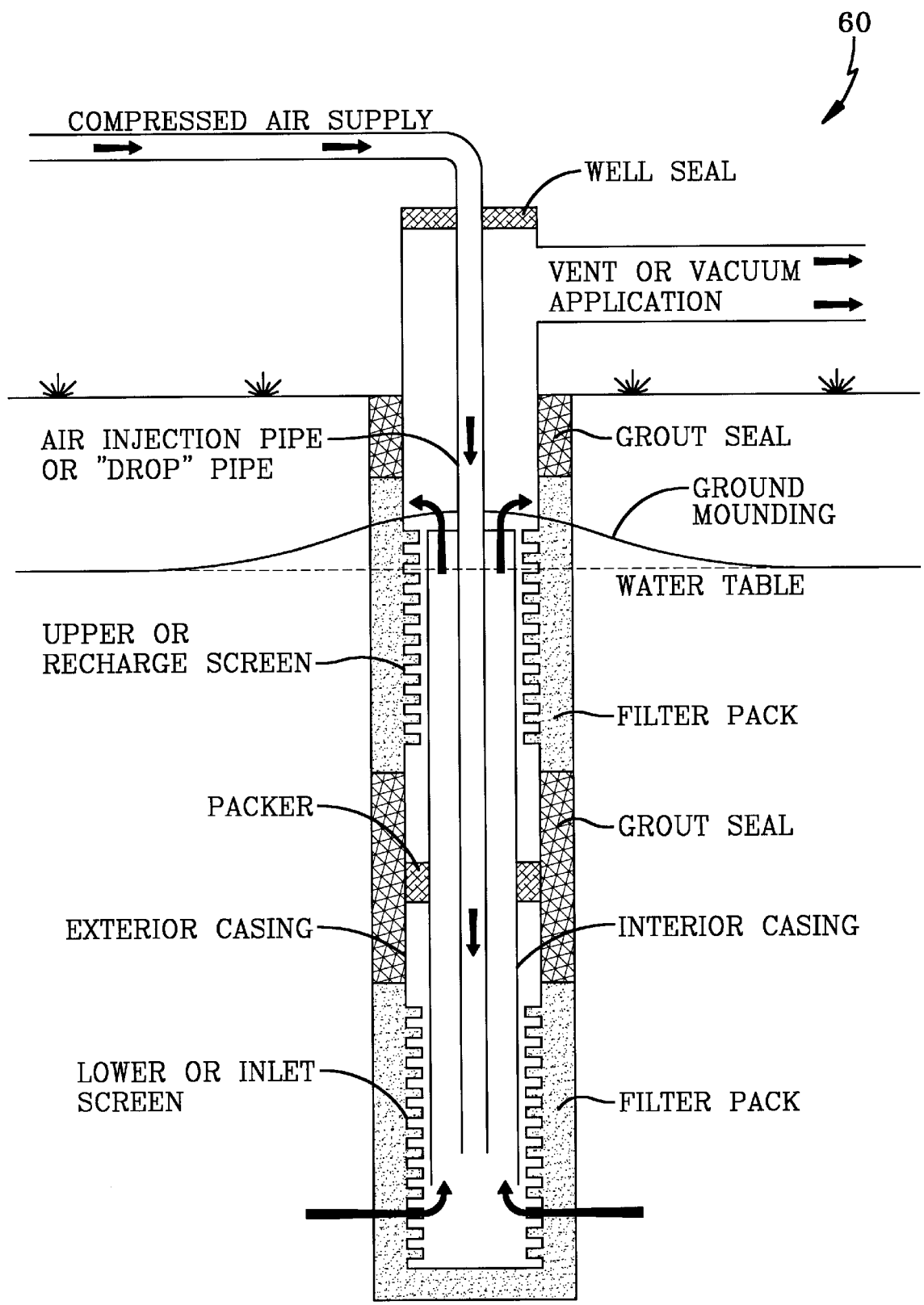
FIG. 2 is a cross-sectional view of a second preferred embodiment of the present invention.
Figure 3:
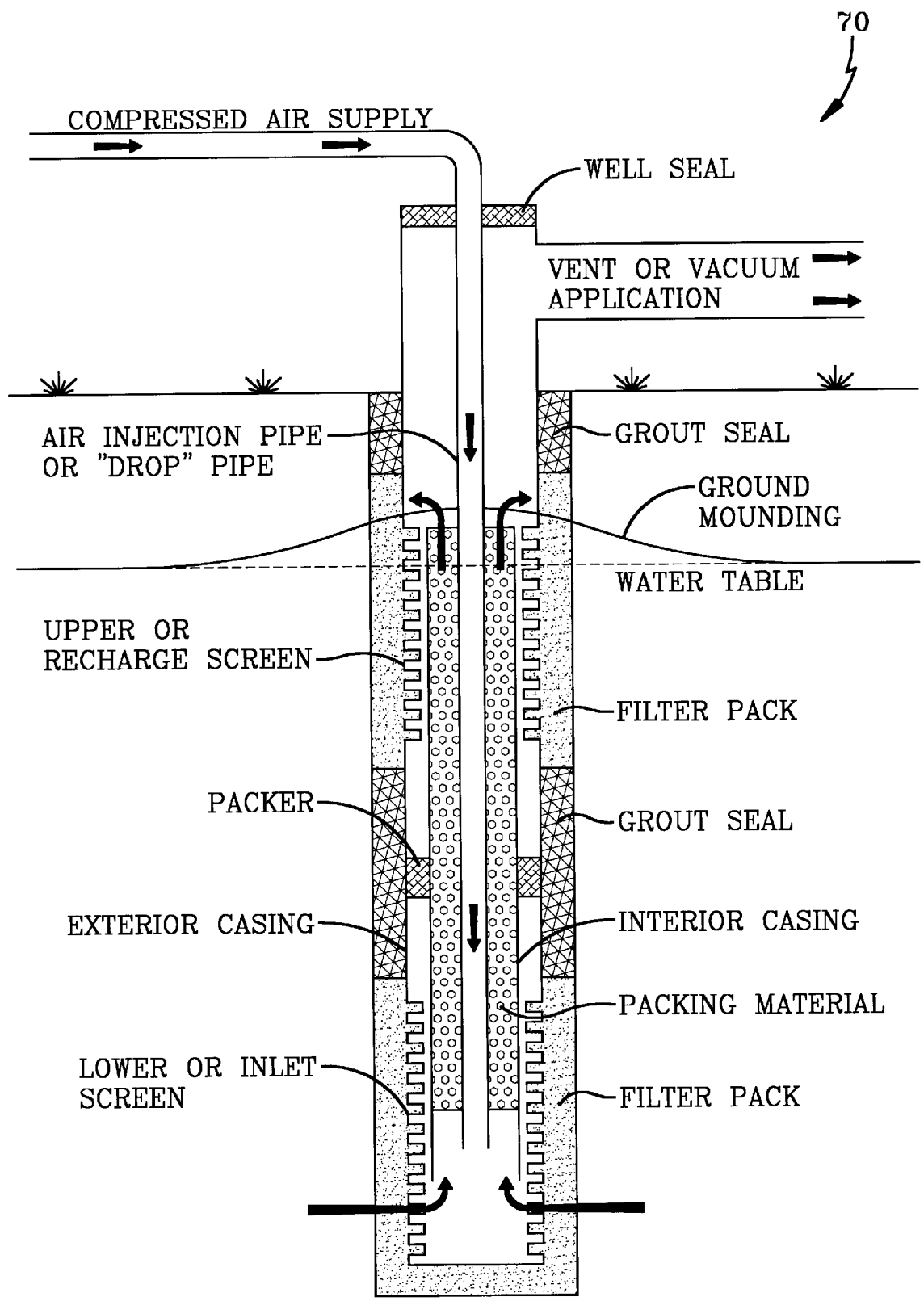
FIG. 3 is a cross-sectional view of a third preferred embodiment of the present invention.
Figure 4:
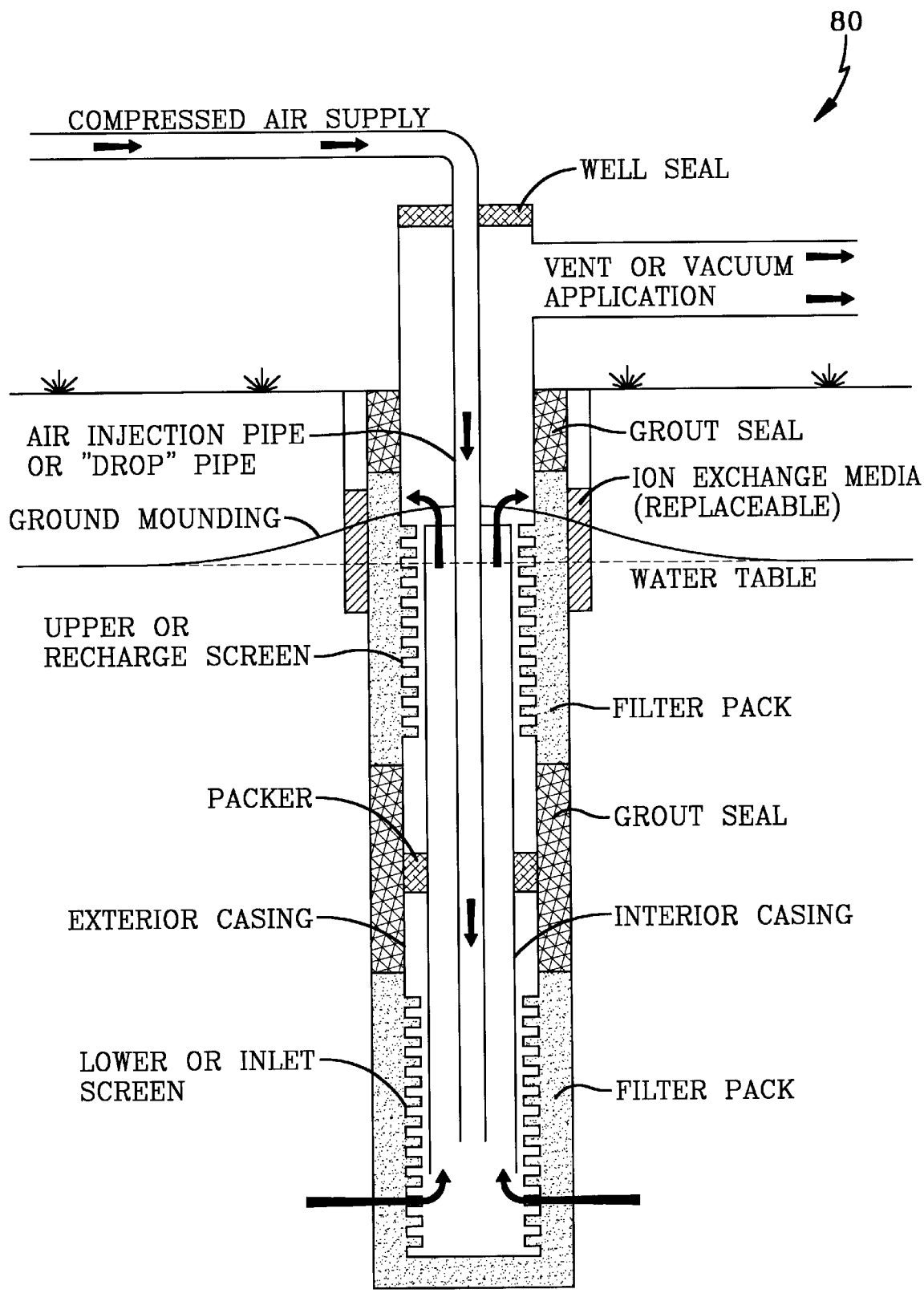
FIG. 4 is a cross-sectional view of a fourth preferred embodiment of the present invention.
Figure 5:
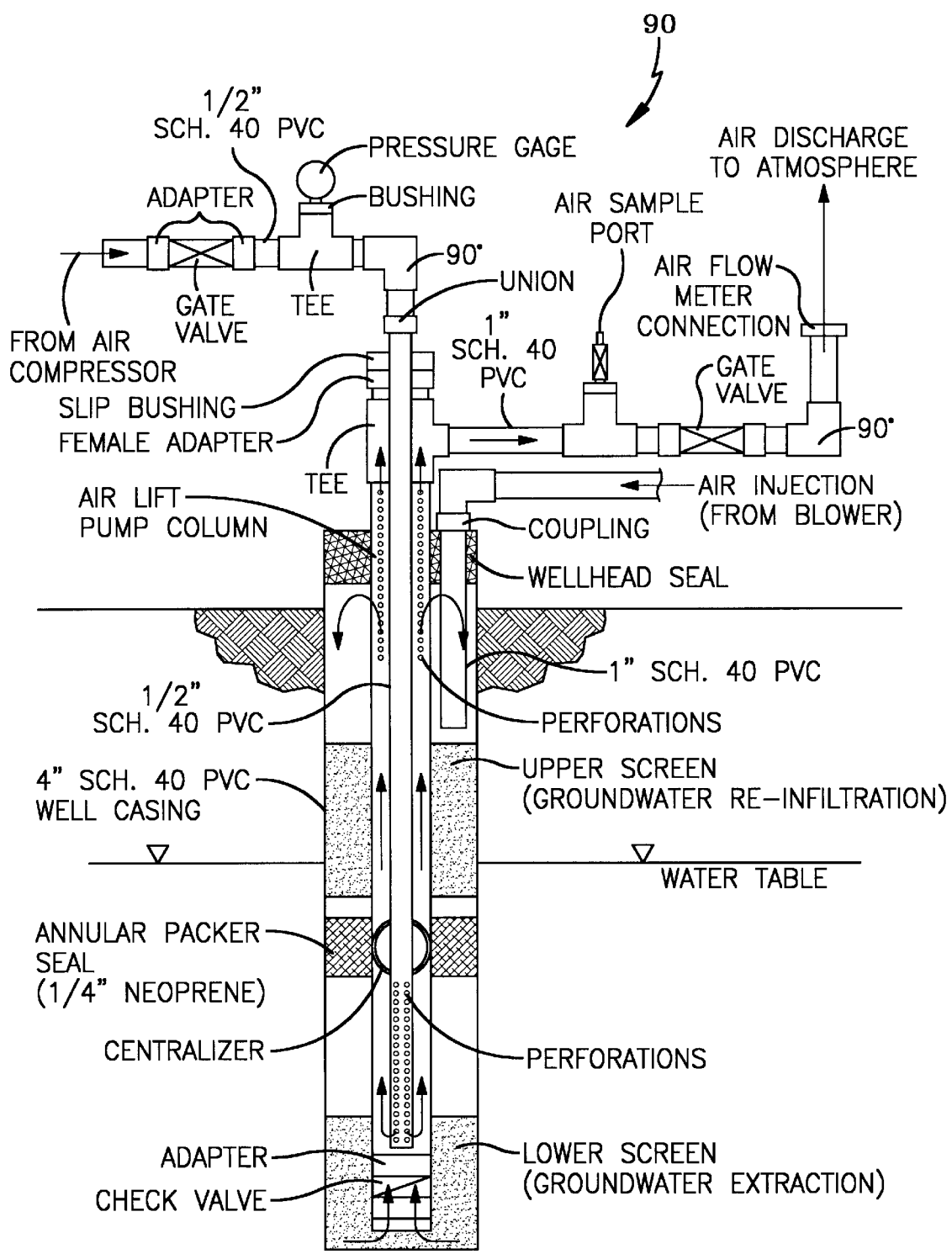
FIG. 5 is a cross-sectional view of a fifth preferred embodiment of the present invention.
Figure 6:
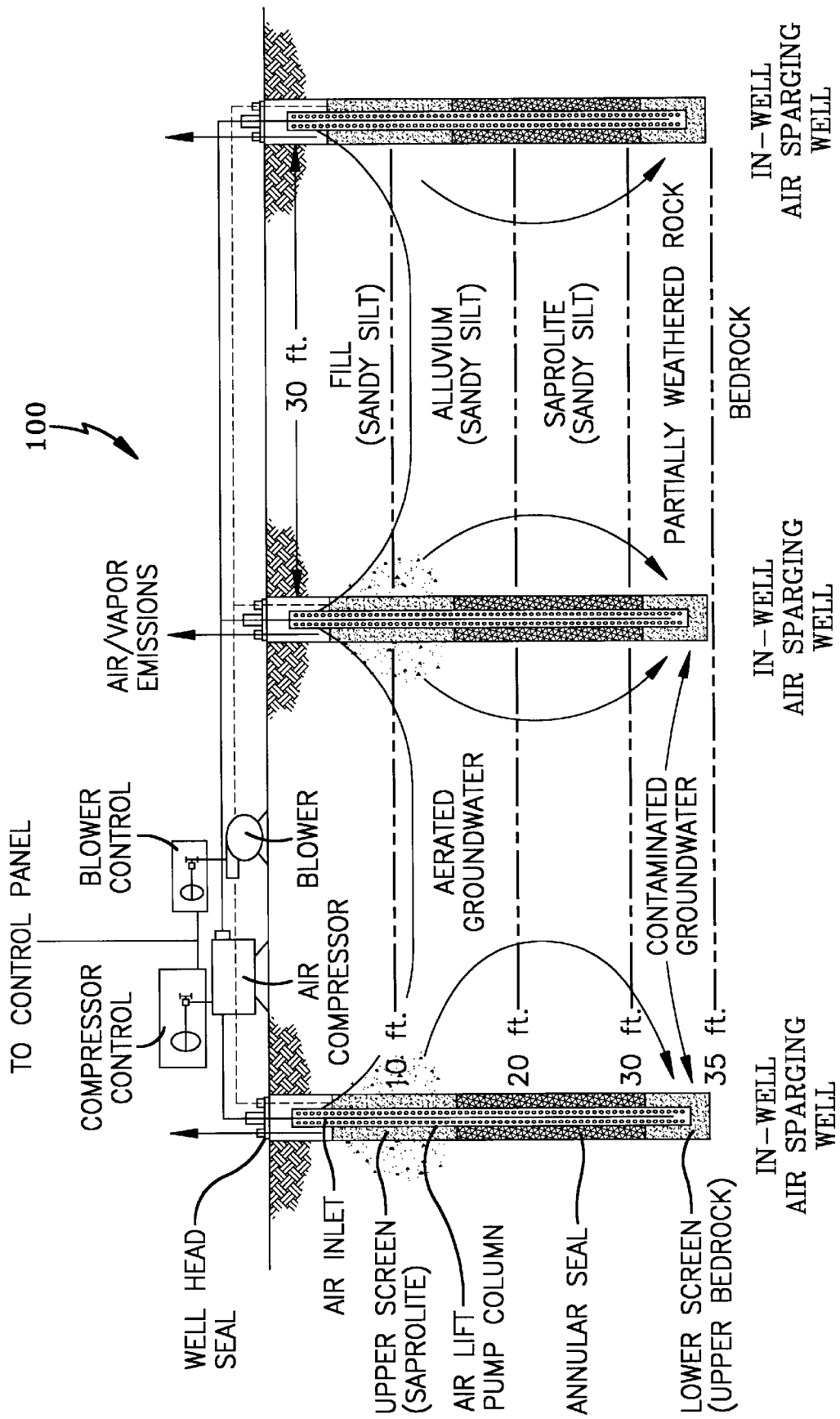
FIG. 6 is a cross-sectional view of a sixth preferred embodiment of the present invention.

FIGS. 2 through 6 show various embodiments of systems of the present invention. FIG. 2 shows a system 60. The system of FIG. 2 also uses an air injection pipe within an inner casing to pump compressed air into the lower portion of a well. Water passing into the lower portion of the well through an inlet screen is mixed with the compressed air, thereby forming air bubbles. VOC's are transferred from the water to the compressed air as the water and air bubbles are forced upward and out of the top of the interior casing, where the VOC's are stripped from the air via a vacuum means before the sparged water is allowed to reenter the water table by passing through an inlet screen located in an upper portion of the interior casing and a filter pack placed in the well. FIG. 3 shows a system 70. The system of FIG. 3 is similar to the system of FIG. 2, except that a packing material is placed between the outside wall of the air injection tube and the inside wall of the interior casing to improve the transfer of VOC's to the water as the water and air bubbles travel over the packing material on the way up the well. FIG. 4 shows a system 80. The system of FIG. 4 is very similar to the system of FIG. 1, except that in the system of FIG. 4 the water in the phreatic zone is caused to pass through a filter pack prior to entering the lower portion of the well through an inlet screen. Additionally, along with causing the sparged water to pass through a filter pack after exiting the top of the interior casing, the system of FIG. 4 also causes the sparged water to pass over replaceable ion exchange media prior to returning to the water table. FIG. 5 illustrates a system similar to that of FIGS. 1, 2 and 4, wherein compressed air is injected into the bottom of a well via an air injection tube placed within an educator tube. However, in this embodiment the injection tube has perforations at a lower end for allowing the compressed air to mix with water entering the bottom portion of the well, and the eductor tube has perforations at an upper section for allowing the sparged water to reenter the well and for VOC's stripped from the water to exit into a collection system. The portion of the well receiving the sparged water may receive additional air injection from a blower as the sparged water passes through an upper screen in the well and passes back into the water table. FIG. 6 shows a system comprising multiple wells using in-well air sparging to provide for decontamination of a larger area.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for gas sparging of contaminants from groundwater, said method comprising the steps of:

injecting a gas into the lower extent of a well, said injected gas producing gas bubbles in groundwater located therein and forcing a combination of said groundwater and said gas bubbles to simultaneously rise up said well, whereby VOCs in said groundwater are transferred to said rising gas bubbles inside said well;

placing material into said well, such that said groundwater and said gas bubbles are forced to pass over the surface of said material as said groundwater and said gas bubbles simultaneously travel up said well, thereby improving the transfer efficiency of said VOC's to said gas bubbles; and separating said gas bubbles from said groundwater.

2. The method of claim 1 further comprising:

supplying gas to the lower extent of said well by operating a pump in fluid communication with a tube positioned within a conduit extending within said well;

wherein said tube has an opening at its lower extent.

3. The method of claim 1 further comprising:

capturing said separated gas bubbles as a gas mixture; and storing said gas mixture.

4. The method of claim 3 further comprising:

removing contaminants from said gas mixture; and oxygenating said gas mixture.

5. The method of claim 4 further comprising returning said gas mixture which has been oxygenated to a supply of said gas.

6. The method of claim 1 wherein said gas is air.

7. The method of claim 1 wherein said gas is carbon monoxide.

* * * * *